United States Patent
Kasper et al.

(10) Patent No.: US 9,429,473 B2
(45) Date of Patent: Aug. 30, 2016

(54) TERAHERTZ SPECTROMETER AND METHOD FOR REDUCING PHOTOMIXING INTERFERENCE PATTERN

(71) Applicant: Joseph R. Demers, Pasadena, CA (US)

(72) Inventors: Bryon L. Kasper, Sierra Madre, CA (US); Joseph R. Demers, Pasadena, CA (US)

(73) Assignee: Joseph R. Demers, Pasadena, CA (US)

( * ) Notice: Subject to any disclaimer, the term of this patent is extended or adjusted under 35 U.S.C. 154(b) by 0 days.

(21) Appl. No.: 14/515,852

(22) Filed: Oct. 16, 2014

(65) Prior Publication Data

US 2016/0109294 A1    Apr. 21, 2016

(51) Int. Cl.
*G01J 5/02* (2006.01)
*G01J 3/433* (2006.01)
*G01J 3/10* (2006.01)

(52) U.S. Cl.
CPC .............. *G01J 3/4338* (2013.01); *G01J 3/108* (2013.01)

(58) Field of Classification Search
CPC .......... G01J 3/10; G01J 3/4338; G01J 3/108; G01J 3/28; G01J 3/433
USPC .................................................... 250/339.07
See application file for complete search history.

(56) References Cited

U.S. PATENT DOCUMENTS

| | | |
|---|---|---|
| 4,594,511 A | 6/1986 | Cooper et al. |
| 5,379,110 A | 1/1995 | Matsui et al. |
| 5,379,309 A | 1/1995 | Logan, Jr. |
| 5,623,145 A | 4/1997 | Nuss |
| 6,304,219 B1 | 10/2001 | Rothe et al. |
| 6,348,683 B1 | 2/2002 | Verghese et al. |
| 6,434,496 B1 | 8/2002 | Dong et al. |
| 6,545,785 B1 | 4/2003 | Heflinger et al. |
| 6,811,552 B2 | 11/2004 | Weil, Sr. et al. |
| 6,816,647 B1 | 11/2004 | Rudd et al. |
| 6,828,558 B1 | 12/2004 | Arnone et al. |
| 6,844,552 B2 | 1/2005 | Zhang et al. |
| 6,849,852 B2 | 2/2005 | Williamson |
| 6,865,014 B2 | 3/2005 | Ciesla et al. |
| 6,957,099 B1 | 10/2005 | Arnone et al. |
| 7,126,078 B2 | 10/2006 | Demers et al. |
| 7,174,037 B2 | 2/2007 | Arnone et al. |
| 7,244,934 B2 | 7/2007 | Arnone et al. |
| 7,291,835 B2 | 11/2007 | Overney |

(Continued)

FOREIGN PATENT DOCUMENTS

| | | |
|---|---|---|
| EP | 1 233 527 A1 | 8/2002 |
| GB | 2 381 121 A | 4/2003 |

(Continued)

OTHER PUBLICATIONS

Arnone et al., "Applications of Terahertz (THz) Technology to Medical Imaging," *Proc. SPIE Terahertz Spectroscopy Applicat. II*, 1999; 3823:209-219.

(Continued)

*Primary Examiner* — David J Makiya
*Assistant Examiner* — Taeho Jo
(74) *Attorney, Agent, or Firm* — Pritzkau Patent Group, LLC

(57) ABSTRACT

Highly advantageous spectrometer systems and associated methods are disclosed which utilize phase modulation in conjunction with first and second harmonic detection to reduce or eliminate negative impacts from interference patterns.

27 Claims, 7 Drawing Sheets

(56) References Cited

U.S. PATENT DOCUMENTS

| | | | |
|---|---|---|---|
| 7,291,839 B1* | 11/2007 | Demers | G01J 3/42 250/338.1 |
| 7,335,883 B2 | 2/2008 | Wallace et al. | |
| 7,439,511 B2 | 10/2008 | Demers | |
| 7,485,863 B2 | 2/2009 | Cole | |
| 7,535,005 B2 | 5/2009 | Demers | |
| 7,781,736 B2* | 8/2010 | Logan, Jr. | G01J 3/10 250/338.1 |
| 7,804,069 B2 | 9/2010 | Tribe | |
| 7,936,453 B2 | 5/2011 | Logan, Jr. et al. | |
| 7,963,571 B2 | 6/2011 | Martin | |
| 8,003,947 B1* | 8/2011 | Majewski | G01J 3/42 250/360.1 |
| 8,138,477 B2 | 3/2012 | Gregory | |
| 8,604,433 B2* | 12/2013 | Logan, Jr. | G01J 3/10 250/336.1 |
| 8,829,440 B2 | 9/2014 | Logan, Jr. et al. | |
| 2002/0067480 A1* | 6/2002 | Takahashi | G01N 21/3581 356/317 |
| 2003/0155512 A1 | 8/2003 | Arnone et al. | |
| 2004/0065831 A1 | 4/2004 | Federici et al. | |
| 2005/0162658 A1 | 7/2005 | Pepper | |
| 2006/0084180 A1 | 4/2006 | Paldus et al. | |
| 2006/0214107 A1 | 9/2006 | Mueller | |
| 2006/0255277 A1 | 11/2006 | Cole et al. | |
| 2008/0165355 A1* | 7/2008 | Yasui | G01N 21/3586 356/323 |
| 2008/0179519 A1 | 7/2008 | Andonian et al. | |
| 2008/0179528 A1* | 7/2008 | Demers | G01N 21/3581 250/341.1 |
| 2008/0212974 A1 | 9/2008 | Davies et al. | |
| 2008/0251720 A1 | 10/2008 | Xu et al. | |
| 2009/0015843 A1 | 1/2009 | Demers et al. | |
| 2009/0066948 A1 | 3/2009 | Karpowicz et al. | |
| 2009/0091820 A1 | 4/2009 | McCarthy et al. | |
| 2009/0180122 A1* | 7/2009 | Federici | G01J 3/42 356/451 |
| 2009/0200472 A1 | 8/2009 | Gregory | |
| 2009/0283680 A1* | 11/2009 | Logan, Jr. | G01J 3/10 250/339.07 |
| 2010/0001189 A1* | 1/2010 | Federici | H04B 10/00 250/340 |
| 2010/0080505 A1 | 4/2010 | Sartorius et al. | |
| 2010/0092183 A1 | 4/2010 | Kim et al. | |
| 2010/0171835 A1 | 7/2010 | Kasai et al. | |
| 2010/0314545 A1* | 12/2010 | Logan, Jr. | G01J 3/10 250/339.07 |
| 2011/0032955 A1 | 2/2011 | Daiber | |
| 2011/0068268 A1 | 3/2011 | Heidari | |
| 2012/0075477 A1 | 3/2012 | Daly et al. | |
| 2012/0126122 A1* | 5/2012 | Cundiff | G02F 1/0121 250/338.4 |
| 2012/0326039 A1* | 12/2012 | Demers | G01J 3/10 250/338.4 |
| 2013/0200263 A1 | 8/2013 | Logan et al. | |
| 2014/0021351 A1 | 1/2014 | Logan et al. | |
| 2014/0043612 A1 | 2/2014 | Logan, Jr. et al. | |

FOREIGN PATENT DOCUMENTS

| | | |
|---|---|---|
| GB | 2 483 118 A | 2/2012 |
| WO | WO 2007/135382 A2 | 11/2007 |
| WO | WO 2009/082820 A1 | 7/2009 |
| WO | WO 2009/137263 A2 | 11/2009 |
| WO | WO 2009/137263 A3 | 1/2010 |

OTHER PUBLICATIONS

Arnone et al., "Terahertz Imaging Comes Into View," *Phys. World*, 2000; pp. 35-40.

Bartels et al., "Femtosecond Time-Resolved Optical Pump-Probe Spectroscopy at Kilo Rates Over Nanosecond-Time-Delays Without Mechanical Delay Line," *Appl. Phys. Lett.*, 2006; 88:04117.

Bartels et al., "High-Resolution THz Spectrometer with kHz Scan Rates," *Optics Express*, 2006; 14(1):430-437.

Bjanason et al., "ErAs:GaAs Photomixer with two decades tenability and 12 µW Peak Output," *Applied Physics Letters*, 2004; 85(18):3983-3985.

Brown et al., "Characterization of a Planar Self-Complementary Square-Spiral Antenna in the THz Region," *Microwave and Optical Technology Letters*, Mar. 2006; 48(3):524-529.

Brown, "Advancements in Photomixing and Photoconductive Switching for THz Spectroscopy and Imaging," *Proc. of SPIE*, 2013; 7938:793802-1-793802-16.

Chang et al., "Power Scalable Compact THz System Based on an Ultrafast Yb-doped Fiber Amplifier," *Optics Express*, 2006; 14(17):7909-7913.

Chen et al., "Spectroscopic Applications and Frequency Locking of THz Photomixing with Distributed-Bragg-Reflector Diode Lasers in Low-Temperature-Grown GaAs," *Appl. Phys. Lett.*, 1997; 71(12):1601-1603.

Combined Search and Examination Report for Application No. GB1309663.1 dated Nov. 13, 2013; 8 pgs.

Demers et al., "An Optically Integrated Coherent Frequency-Domain THz Spectrometer with Signal-to-Noise Ratio up to 80 dB," 2007 IEEE Conference; pp. 92-95.

Demers et al., "Field-portable THz Spectrometer for Characterization of Explosives and Chemicals," IEEE IRMMW Conference, Houston, TX, Oct. 6, 2011; 26 pgs.

Gutierrez, "An Electro-Optical Frequency Shifter," NASA's Jet Propulsion Laboratory, 2000; Available at <URL:http://www.nasatech.com/Briefs/Sept00/NPO20531.html>.

Hu et al., "Imaging with Terahertz Waves," *Optics Letters*, 1995; 20(16):1716-1718.

Hunsche et al., "Terahertz 'T-Ray' Tomography," *Proc. SPIE Int. Millimeter Submillimeter Waves Applicat. IV.*, 1998; 50(3):426-433.

Intellectual Property Office Search Report for Application No. GB10170462 dated Nov. 16, 2010; 1 pages.

Izutsu et al., "Integrated Optical SSB Modulator/Frequency Shifter," *IEEE Journal of Quantum Electronics*, Nov. 1981 QE-17:2225-2227.

Janke et al., "Asynchronous Optical Sampling for High-Speed Characterization of Integrated Resonant Terahertz Sensors," *Optics Letters*, 2005; 30(11):1405-1407.

Jiang et al., "Terahertz Imaging via Eletrooptic Effect," *IEEE Trans. Microwave Theory Tech.*, 1999; 47:2644-2650.

Logan, Jr. et al., "Field Portable THz Spectrometer for Characterization of Explosives and Chemicals," Emcore Corporation Conference Publication, Oct. 2011; 3 pgs.

McGrath et al., "Superconductive Hot Electron Mixers with Ultra Wide RF Bandwidth for Heterodyne Receiver Applications Up to 3 THz," *Proceedings of the ESA Symposium*, 1997; pp. 401-404.

McIntosh et al., "Terahertz Measurements of Resonant Planar Antennas Coupled to Low-Temperature-Grown GaAs Photomixers," *Appl. Phys. Lett.*, 1996; 69(24):3632-3634.

Mittleman et al., "T-Ray Imaging," *IEEE J. Select. Topics Quantum Electron*, 1996; 2:679-692.

Saleh et al., "Fundamentals of Photonics," Wiley-Interscience, 1991; pp. 719-720, 823-825.

Siegel, "Terahertz Technology," *IEEE Transactions on Microwave Theory and Techniques*, 2002; 50(3):915-917.

Verghese et al., "Generation and Detection of Coherent Terahertz Waves Using Two Photomixers," *Applied Physics Letters*, 1998; 73(26):3824-3826.

Wu et al., "Two-Dimensional Electro-Optic Imaging of THz Beams," *Appl. Phys. Lett.*, 1996; 69(8):1026-1028.

Yasui et al., "Terahertz Frequency Comb by Multifrequency-Heterodyning Photoconductive Detection for High-Accuracy, High Resolution Terahertz Spectroscopy," *Applied Physics Letters*, 2006; 88(241104):1-3.

* cited by examiner

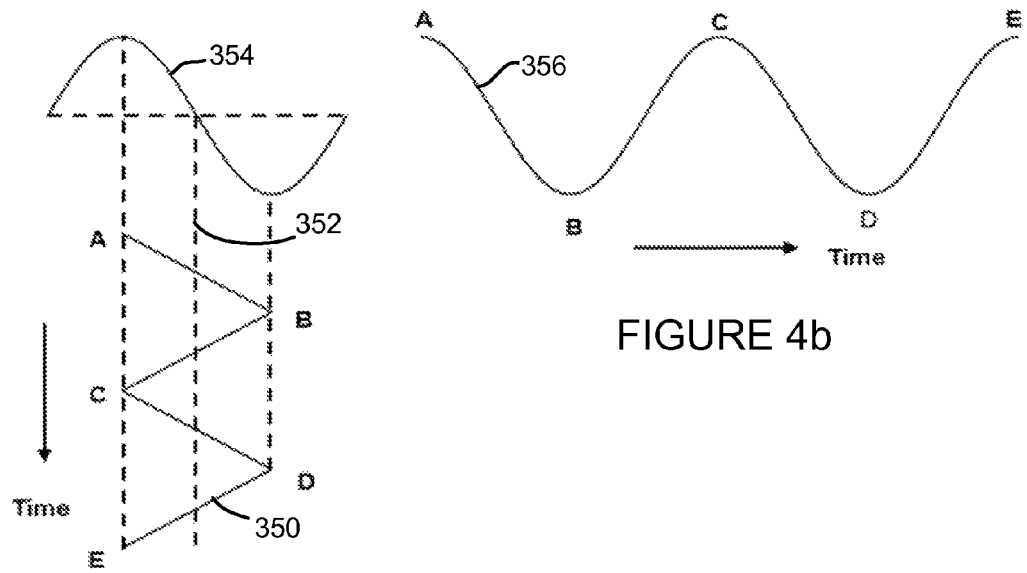
FIGURE 4a
FIGURE 4b
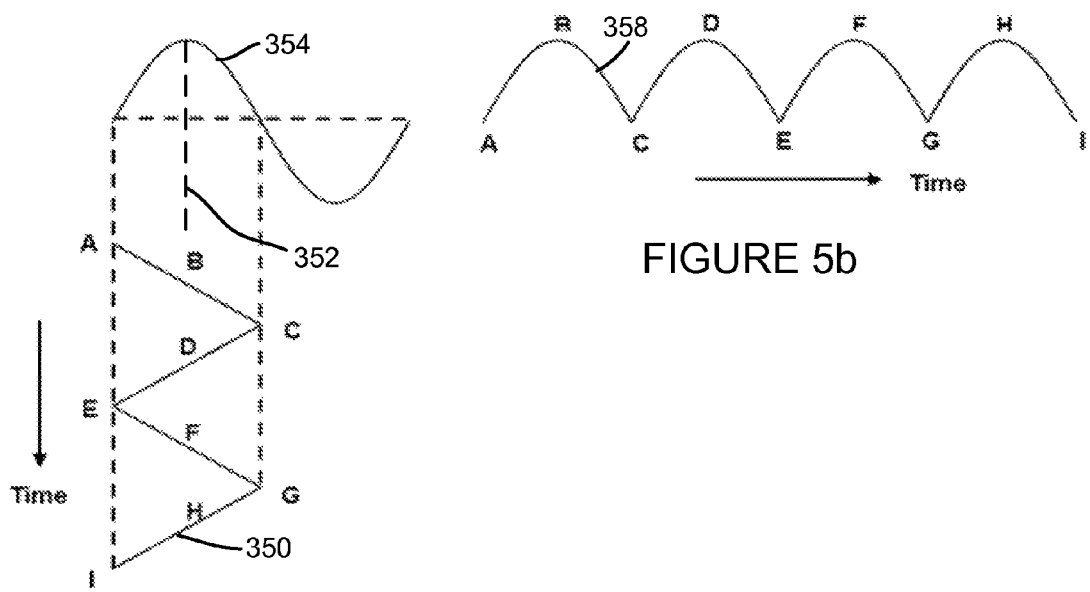
FIGURE 5a
FIGURE 5b

TERAHERTZ SPECTROMETER AND METHOD FOR REDUCING PHOTOMIXING INTERFERENCE PATTERN

REFERENCE TO RELATED APPLICATIONS

This application may be related to U.S. patent applications Ser. No. 12/465,219 filed May 13, 2009, now U.S. Pat. No. 7,781,736; Ser. No. 12,861,651 filed Aug. 23, 2010 now U.S. Pat. No. 8,604,433, and Ser. No. 13/831/438, filed Mar. 14, 2013, now U.S. Pat. No. 8,829,440; and co-pending U.S. patent applications Ser. No. 13/565,021 filed Aug. 2, 2012; Ser.No.14/212,542 filed Mar. 14, 2014; Ser. No. 14/262,291 filed Apr. 25, 2014; and Ser. No. 14/262,249 filed Apr. 25, 2014.

BACKGROUND

The present invention is related to terahertz frequency spectrometers and, more particularly, to an advanced apparatus, system and methods for reducing or eliminating photo-mixing interference patterns from detector photoconductive switch detector signals.

Terahertz frequency spectrometers can utilize photoconductive switches and light sources to generate signals in frequencies ranging from tens of MHz to tens of THz. The light sources can be frequency tunable lasers such as Distributed Feedback Lasers (DFB) which have a light output frequency that can be controlled using temperature. The terahertz frequency can be created by generating two lights at frequencies that are different from one another and applying the two lights to a source photoconductive switch. The same two lights can be applied to a detector photoconductive switch to homodyne detect the high frequency created by the source photoconductor.

Terahertz frequency electromagnetic radiation in the sub-millimeter and terahertz (THz) frequency ranges has been employed for characterizing molecular gases, including materials of atmospheric importance. Recently, terahertz radiation has been utilized for the characterization and/or detection of solids as well as gases. Many different materials have distinct and measurable information signatures in the terahertz frequency range. For example, these materials can absorb electromagnetic radiation at certain terahertz frequencies that are unique for a given material or materials and which can be used to identify the given material. Materials that exhibit these information signatures include: illicit drugs, biologically important compounds such as sugars and hormones, and explosives. Terahertz radiation can also be used in the field of art conservation, for example, to determine the proper materials for restoring paintings.

Many dielectric, nonmetallic materials are transparent at terahertz frequencies which makes it is possible to measure or detect other materials that are hidden behind such terahertz transparent materials. Some examples of terahertz transparent materials include: fabrics, packaging materials, and paper. Also, in the case of art characterization, layers of paint are also transparent to terahertz frequency radiation. Nonpolar liquids are also transparent to terahertz radiation.

In addition, terahertz radiation is non-ionizing and is completely eye safe. Because of this, terahertz radiation can be used in public areas without the risk of harm to humans, flora, or fauna. This can be especially beneficial because people using the terahertz frequency radiation are not encumbered by unwieldy radiation protection such as is common, for example, when using x-rays.

The foregoing examples of the related art and limitations related therewith are intended to be illustrative and not exclusive. Other limitations of the related art will become apparent to those of skill in the art upon reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, methods and associated apparatus are described for determining terahertz frequency spectral information of a material in a sampling area. In an embodiment, a first light is at a first frequency, and a second light is generated at a second frequency such that the first frequency and second frequency are different from one another by a difference frequency. The phase of at least a portion of the first light is modulated relative to the second light by passing the portion of the first light through a phase modulator to produce a phase modulated light at a phase modulation frequency. The phase modulated light and the second light are photo-mixed and a difference frequency signal is generated at the difference frequency based at least in part on the photo-mixing. The difference frequency signal is transmitted through the sampling area wherein the difference frequency signal is modified to include the terahertz frequency spectral information by the material. The modified difference frequency signal is received from the sampling area and a received signal is generated in response. The unmodulated first light and the second light is photo-mixed to generate a detection oscillation. The received signal and the detection oscillation are mixed to generate a detector signal. The detector signal includes an interference pattern resulting from photo-mixing and the terahertz frequency spectral information. A first harmonic component of the detector signal is detected using a first harmonic of the modulation frequency, and a second harmonic component of the detector signal is detected using a second harmonic of the modulation frequency. The first harmonic component and the second harmonic component are combined to produce a power curve of the terahertz frequency spectral information in which the interference pattern is at least partially eliminated.

In another embodiment, a terahertz frequency spectrometer is disclosed for performing spectroscopy on a sample in a sampling area. The spectrometer includes a first light source that is configured for generating a first light at a first frequency, and a second light source for generating a second light at a second frequency. The first and second lights are generated such that the first frequency and second frequency are different from one another by a difference frequency. A phase modulator is included and configured for receiving a phase modulator signal at a phase modulation frequency, and for receiving at least a portion of the first light from the first light source, and for phase modulating at least a portion of the received first light relative to the second light to produce a phase modulated light that is phase modulated at the phase modulation frequency. A source photoconductive switch is included and configured for receiving the phase modulated light and the second light for mixing to produce a beam of electromagnetic energy at the difference frequency in a direction toward the sample area. A detector photoconductive switch is included and arranged for receiving the first light and the second light to produce a local oscillation at the difference frequency in response thereto. The detector photoconductive switch is also arranged to receive at least a portion of the electromagnetic energy from the sample area as influenced by the sample and to produce a received signal that is related to the received electromagnetic energy. The detector photoconductive switch is also arranged to mix the local oscillation and the received signal to produce a detector signal that is related to the difference between the local oscillation and the received signal and which includes terahertz frequency spectral information related to the sample. The detector signal including an interference pattern resulting from the detector photoconductive switch photomixing. A first harmonic detector is included and configured to receive the detector signal and to detect a first harmonic component of the detector signal using a first harmonic of the phase modulation frequency. A second harmonic detector is included and configured to receive the detector signal and to detect a second harmonic component of the detector signal using a second harmonic of the phase modulation frequency. A controller is included and configured to receive the detected first and second harmonic components and to combine the first and second harmonic components to produce a power curve of the terahertz frequency spectral information such that the interference pattern is at least partially eliminated.

In yet another embodiment, a terahertz frequency spectrometer is disclosed for performing spectroscopy on a sample in a sampling area. A first light source is configured for generating a first light at a first frequency and a second light source for generating a second light at a second frequency, wherein the first and second lights are generated such that the first frequency and second frequency are different from one another by a difference frequency. A phase modulator is configured for receiving a phase modulator signal at a phase modulation frequency, and receiving the first light from the first light source and phase modulating a first portion of the first light and passing a second portion of the first light that is unmodulated to produce a first phase modulated light at the phase modulation frequency, and receiving the second light from the second light source and phase modulating a first portion of the second light and passing a second portion of the second light that is unmodulated to produce a second phase modulated light at the phase modulation frequency.

A source photoconductive switch is configured for receiving the first phase modulated light and the second phase modulated light for mixing to produce a beam of electromagnetic energy at the difference frequency in a direction toward the sample area. A detector photoconductive switch is arranged for receiving the first unmodulated light and the second unmodulated light to produce a local oscillation at the difference frequency in response thereto. The detector photoconductive switch is also arranged to receive at least a portion of the electromagnetic energy from the sample area as influenced by the sample and to produce a received signal that is related to the received electromagnetic energy. The detector photoconductive switch is also arranged to mix the local oscillation and the received signal to produce a detector signal that is related to the difference between the local oscillation and the received signal and which includes information related to the sample. The detector signal includes an interference pattern resulting from the detector photoconductive switch photo-mixing. A first harmonic detector is configured to receive the detector signal and to detect a first harmonic component of the detector signal using the phase modulation signal. A second harmonic detector is configured to receive the detector signal and to detect a second harmonic component of the detector signal using the phase modulation signal. A controller is configured to receive the detected first and second harmonic components and to combine the first and second harmonic components to produce a power curve of the terahertz frequency spectral information such that the interference pattern is at least partially eliminated.

In addition to the exemplary aspects and embodiments described above, further aspects and embodiments will become apparent by reference to the drawings and by study of the following descriptions.

BRIEF DESCRIPTION OF THE DRAWINGS

FIG. 4a is an illustration of a phase modulation waveform at a zero voltage phase offset that can be used in the spectrometer of FIG. 3.

FIG. 4b is an illustration of components of a detector signal which can result from the waveform of FIG. 4a.

FIG. 5a is an illustration of a phase modulation waveform at a non-zero degree phase offset that can be used in the spectrometer of FIG. 3.

FIG. 5b is an illustration of components of a detector signal which can result from the waveform of FIG. 5a.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be adopted for purposes of enhancing the reader's understanding, with respect to the various views provided in the Figures, and is in no way intended as being limiting.

Figure 1:
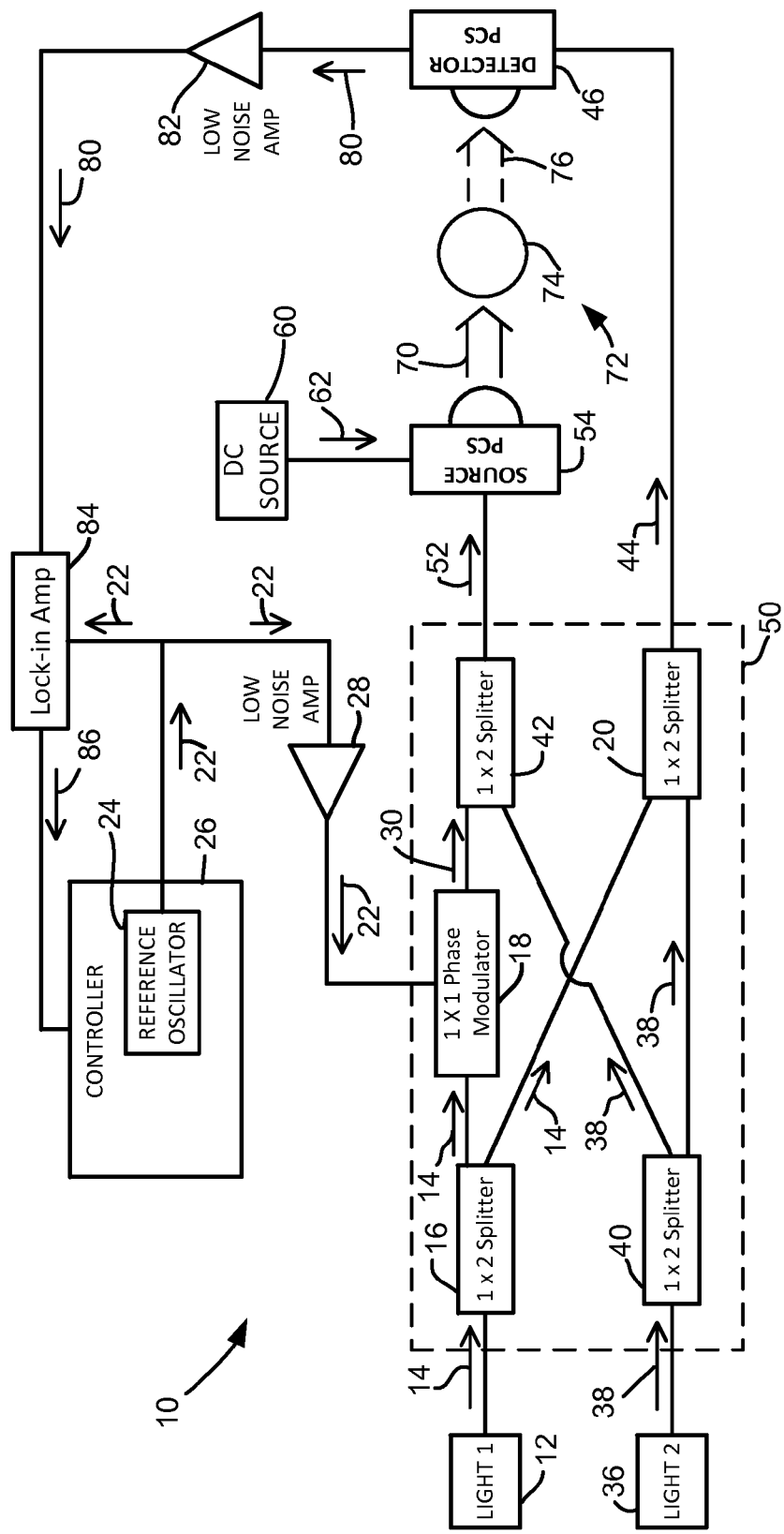
FIG. 1 is a block diagram illustrating an embodiment of a spectrometer system which produces power curves having interference patterns.

Attention is now directed to the Figures wherein like items may refer to like components throughout the various views. FIG. 1 is a diagrammatic representation of a simplified terahertz spectrometer system 10 which can be employed for terahertz radiation production and detection for spectrometry. Spectrometer system 10 has been presented for purposes of providing a framework for the discussion of Applicants' recognitions in the context of problems which can arise in spectrometers utilizing detector photoconductive switches.

Spectrometer system 10 includes a first light source 12 that produces a first light 14 which is optically coupled to a 1×2 optical splitter 16. Optical splitter 16 splits first light 14 and supplies the first light to a 1×1 phase modulator 18 and a 1×2 splitter 20. The phase modulator is connected to receive an oscillator signal 22 from a reference oscillator 24 which can produce the oscillator signal at a modulation frequency under the control of a controller 26. A low noise amplifier 28 amplifies the oscillator signal from the reference oscillator and supplies the amplified oscillator signal to the phase modulator. The phase modulator is configured to receive the oscillator signal and to modulate the phase of first light 14 at the modulation frequency in response to the oscillator signal. The phase modulator produces a phase modulated first light 30.

Spectrometer system 10 also includes a second light source 36 that produces a second light 38 at a frequency that is different than the frequency of first laser light 14 by a difference frequency. Although not specifically shown, the first and/or second laser can be controlled by controller 26 to produce the difference frequency at a selected frequency within a range at a given time. Second light 38 is optically coupled to a 1×2 splitter 40 which splits second light 38 and supplies the light to a 1×2 splitter 42 and 1×2 splitter 20. Splitter 20 combines first light 14 and second light 38 to produce a combined light 44 which is supplied to a detector photoconductive switch (PCS) 46. Splitters 16, 20, 40, 42, phase modulator 18, and the various light guides to optically couple these devices can be referred to as an optical circuit 50. Optical splitter 42 receives laser light 38 and phase modulated first light 30 and combines them into a combined light 52 which is supplied to a source PCS 54.

A DC driver 60, which can be controlled by controller 26, produces a driver signal 62 which is supplied to source PCS 54 for biasing an antenna (not shown). The source PCS receives the combined light 52 and driver signal 62 and produces a difference frequency signal 70 that is phase modulated at the modulation frequency. The difference frequency signal can be in the form of a beam of radiation. The difference frequency signal has a frequency that is equal to the difference frequency between modulated first light 30 and second light 38. The difference frequency signal radiation beam is transmitted toward the detector PCS through a sample area 72 in which a sample 74 can be placed for analysis.

At least a portion of the difference frequency signal radiation beam passes through or otherwise interacts with the sample in the sample area or with the atmosphere if no sample is in the sample area. The sample can modify the beam by absorption, reflection and/or scattering in a manner that is related to the type of material of the sample and which is determinable by the radiation beam reaching the detector. The radiation beam reaching detector PCS 46 is a modified difference frequency signal 76 since the beam now includes information related to the sample. The detector PCS includes an antenna (not shown) that receives the modified difference frequency signal. The modified difference frequency signal creates a detector antenna signal in the detector PCS antenna. Combined light 44 produces an oscillation in the detector PCS at a frequency that is the difference between the frequencies of the first and second lights and which can be referred to as a local oscillation. The local oscillation can be an oscillation of conductance.

Detector PCS 46 mixes the local oscillation and the detector antenna signal to produce a detector signal 80 at the difference between the frequency of the local oscillation and the frequency of the modified antenna signal. The detector signal includes a modified signal component related to the sample and a modulation frequency component related to the modulation frequency produced by reference oscillator 24. An amplifier 82 amplifies detector signal 80 to produce an amplified version of the detector signal which is passed to a lock-in amplifier 84. Lock-in amplifier 84 receives reference oscillator signal 22 from the reference oscillator and uses the reference oscillator signal, which is the same frequency as the modulation frequency component of the detector signal, to detect the modified signal component from the detector signal. Lock-in amplifier 84 produces a data signal 86 which can be passed to controller 26. Controller 26 can process the data signal in various ways and can use the data signal to produce a plot of the power over a range of different frequencies.

Spectrometer system 10 can scan the sample area with the difference frequency radiation beam using a range of different terahertz frequencies. The terahertz frequency can be swept through the range or one or more discrete frequencies can be used. The spectrometer system can scan the sample area without a sample in the sample area to obtain information about the background spectrum of the system. The background spectrum information can include information that may influence the scan of a sample but which does not provide useful information about the sample. The system can make several background spectrum scans which can be used together to provide more accurate information about the background spectrum. The scans can be averaged for this purpose. The spectrometer system can also be used for scanning the sample multiple times and the multiple scans can be used to obtain more accurate information about the sample. The background spectrum information can be removed from the scan of the sample to increase the accuracy of the sample scan.

Figure 2:
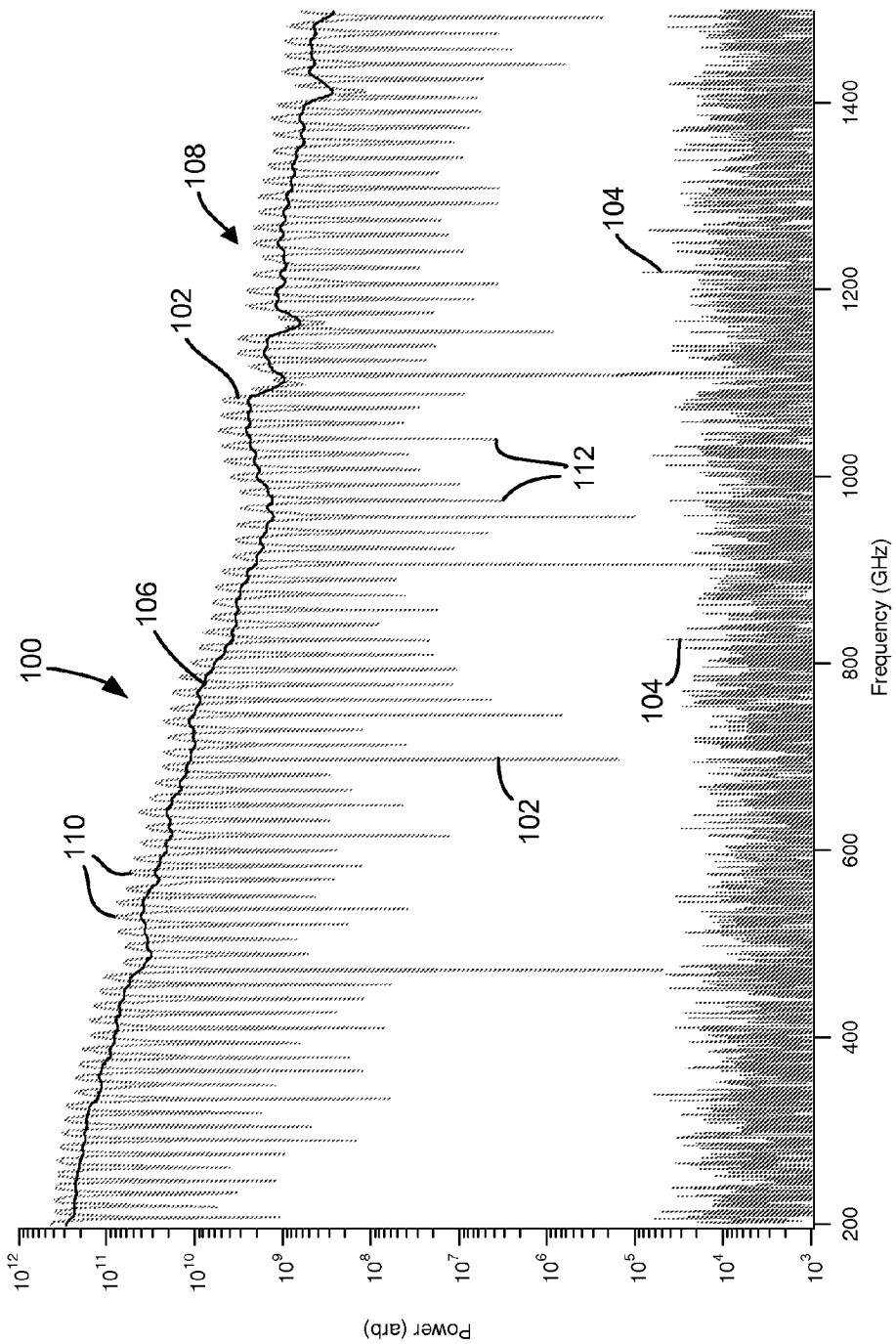
FIG. 2 is a graph having a plot of a power curve with an interference pattern generated by a spectrometer such as shown in FIG. 1.

Applicants recognize that the coherent detection used in terahertz spectrometer systems can introduce an unwanted interference pattern into the data signal. Referring now to FIG. 2, a graph 100 is shown which illustrates a data signal 102 which can be received by the spectrometer controller, a noise signal 104 which can be part of data signal 102, and a power curve 106. Data signal 102 includes the modified signal component that is related to the sample and/or background in the sample area, and an interference pattern 108 which has a series of peaks 110 and nulls 112. The controller can generate power curve 106 from data signal 102, however, the modified signal component of the data signal can be almost completely obscured by the interference pattern. Graph 100 is based on a spectrometer scan of lab air in the sample area with the terahertz frequency tuned from about 200 GHz to about 1,500 GHz. The scan resulted in a SNR of greater than 70 dB-Hz at 200 GHZ; greater than 50 dB-Hz at 1 THz; and greater than 40 dB-Hz at 1.5 THz.

Interference patterns can occur in spectrometers using coherent detection in which the source PCS and detector PCS utilize light from the same light sources for generating the terahertz signals. In the coherent detection spectrometer, there is a source PCS path which the light and terahertz signals take to become the detector antenna signal in the detector PCS. There is also a detector PCS path through which the light travels to the detector PCS to generate the local oscillation in the detector PCS. Since the source PCS path and detector PCS paths have different lengths, there is a phase difference between the signals when they are mixed in the detector PCS. This phase difference changes as the terahertz radiation in the system is swept through a range of frequencies to identify terahertz spectral information about the sample or background in the sample area. This changing phase difference results in the constructive and destructive beating of the mixed signals with the destructive beat resulting in nulls, which can also be referred to as fringes. These nulls correspond to reduced power output so resolving narrow spectral features that fall on these nulls can be difficult or impossible.

The introduction of a sample into the sample area can also change the effective path length of the source PCS path since the terahertz electromagnetic radiation passing through the sample area now has to pass through a sample which can introduce phase changes. Because of this, a scan of the background in the sample area can have a different interference pattern than a scan of a sample. This can make the subtraction of a background scan from a sample scan to eliminate the interference pattern unworkable. The source PCS and detector PCS can be moved relative to one another to match the effective path length when a sample is introduced, however this technique is time consuming and can provide inconsistent results.

Figure 3:
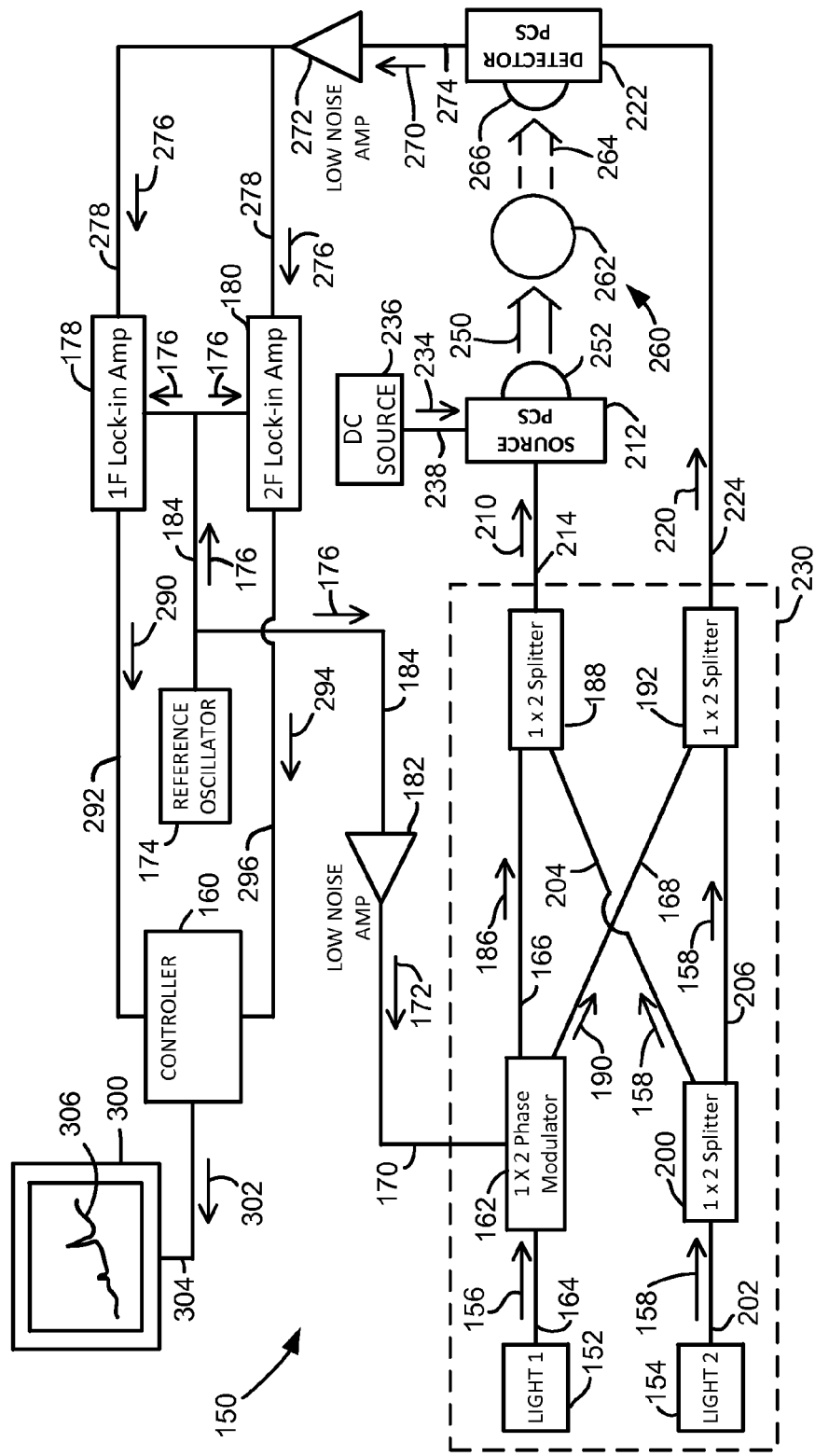
FIG. 3 is a diagrammatic illustration of an embodiment of a spectrometer system with a configuration for reducing or eliminating interference patterns.

Referring now to FIG. 3, an improved spectrometer system 150 is shown in which the negative impacts of interference patterns are reduced or eliminated. Spectrometer system 150 includes a first light source 152 and a second light source 154. The first and second light sources can be semiconductor diode lasers, such as distributed feedback (DFB) lasers, that each produce laser light at a different single frequency from one another at any given time. The first light source can generate a first light 156 and a second light source can generate a second light 158. The frequency of the light from either one or both of the light sources can be controlled using a controller 160, and the difference between the light frequencies can be in the terahertz frequency range when used as the spectrometer shown. A range of terahertz frequencies can be produced over a time period by changing the difference between the light frequencies over the time period. The range of terahertz frequencies can be from about 10 MHz to about 10 THz, and the range of terahertz frequencies can be a smaller range that includes frequencies known to be related to a particular sample.

Spectrometer system 150 includes a phase modulator 162 which is configured to receive first light 156 through a waveguide 164 that is optically connected to an input of the phase modulator. Phase modulator 162 is a 1×2 phase modulator that includes the optical input connected to waveguide 164 and two optical outputs which are connected to waveguides 166 and 168. Phase modulator 162 also includes a control input which is electrically connected to a control line 170 for receiving a phase modulator control signal 172.

A reference oscillator 174 generates an oscillator signal 176 at a low frequency and supplies the signal to a 1F lock-in amplifier 178, a 2F lock-in amplifier 180, and a low noise amplifier 182 through a reference oscillator conductor 184. The low frequency oscillator signal can have a frequency of one or more kHz to a few MHz. In an embodiment, the reference oscillator can generate the oscillator signal in a range from about 1 kHz to about 10 MHz. The reference oscillator can originate the oscillator signal as a square wave and the reference oscillator can include a waveform shaping circuit that converts the square wave into a triangle wave or a sine wave that has slower transitions between maximum and minimum values than the square wave. The reference oscillator can adjust the amplitude of the oscillator signal and the reference oscillator can also be configured to generate any other suitable waveform. Low noise amplifier 182 receives the oscillator signal and amplifies the oscillator signal to produce phase modulator control signal 172 which the low noise amplifier supplies to phase modulator 162 over control line 170. The oscillator signal controls the phase modulator to modulate the phase of a portion of first light 156 at a modulation frequency equal to the frequency of the oscillator signal, as yet to be described. The frequency of the phase modulation is controlled by the frequency of the oscillator signal and the degree of phase change during each oscillation is controlled by the amplitude of the phase modulator control signal. In the present embodiment, the phase modulator can be adjusted using the controller so that the amplitude of the phase modulator signal causes the phase modulated light to have a periodic phase modulation of approximately 180 degrees relative to the input light.

Phase modulator 162 can phase modulate a portion of the received first light 156 relative to the input first light, and therefore to the second light, to produce a phase modulated light 186 and can supply the phase modulated light to a 1×2 splitter 188 through waveguide 166. Phase modulator 162 can also pass a portion of the received first light 156 without modulation to produce an unmodulated, phase modulator light 190 and can supply the phase modulator light to a 1×2 splitter 192 through waveguide 168. Light passing through the phase modulator, either modulated or unmodulated, can be referred to as phase modulator light. Phase modulator light that is modulated by the phase modulator can be referred to as phase modulated light. The phase modulator can modulate the phase of the first light relative to the second light using phase modulator signals having different waveforms, different frequencies and amplitudes, and/or can introduce a set phase offset between the first and second lights.

Second light 158 is supplied to a 1×2 splitter 200 over a waveguide 202. Splitter 200 receives the second light and splits the second light into two approximately equal portions. Splitter 200 supplies the second light to splitters 188 and 192 over waveguides 204 and 206, respectively. Splitter 188 receives phase modulated light 186 and second light 158 and combines these lights into a combined light 210 which contains both the phase modulated first light and the second light. Splitter 188 supplies combined light 210 to a source PCS 212 over a waveguide 214. Splitter 192 receives phase modulator light 190 and second light 158 and combines these lights into a combined light 220 which contains both the unmodulated phase modulator first light and the second light. Splitter 192 supplies combined light 220 to a detector PCS 222 over a waveguide 224. First and second light sources 152 and 154; phase modulator 162; splitters 188, 192, and 200; along with the various waveguides can be referred to in combination as optical circuit 230.

Source PCS 212 receives a DC bias driver signal 234 from a DC driver 236 over a driver conductor 238. The source PCS utilizes the driver signal to bias a source PCS antenna which can be a spiral antenna (not specifically shown). Combined light 210, received by the source PCS, creates a beat pattern which produces a combined optical amplitude that varies at a rate given by the difference between the two optical frequencies in the combined light. This varying optical amplitude causes a resistance of the source PCS to vary at the difference frequency rate and the bias on the source PCS antenna causes a corresponding current signal through the varying resistance. Since the difference frequency is in the terahertz range, the current signal is also in the terahertz range and the terahertz current signal from the source PCS flows through the source PCS antenna. In response, the source PCS antenna generates a difference frequency signal, which in this embodiment is terahertz electromagnetic radiation 250. The source PCS can focus the electromagnetic radiation into a beam using terahertz optics 252. The phase of the electromagnetic radiation beam depends upon the relative phase of the phase modulated light and the second light in combined light 210 at a point where the photoconductive switch of the source PCS is illuminated. Therefore, the phase offset between the phase modulated light and the second light is carried through to electromagnetic radiation beam 250.

Electromagnetic radiation beam 250 is directed toward detector PCS 222 through a sampling area 260 in which a sample 262 can be placed for analysis. The beam interacts with whatever is in the sampling area and a modified difference frequency signal is produced, which in this embodiment is a modified electromagnetic radiation beam 264. Modified electromagnetic radiation beam 264 includes terahertz frequency spectral information that is related to whatever is in the sampling area. For example, as the electromagnetic radiation beam is swept through a range of terahertz frequencies, certain terahertz frequencies, which depend on the type of material in the sample can be absorbed by the material to some extent. Other terahertz frequencies of terahertz radiation beam 250, which are not absorbed by the material or are only partially absorbed, can pass through the material from the source PCS to the detector PCS. These terahertz frequencies can exhibit spectral information which can be used for identifying a compound material and/or materials in the compound material. If, for example, nothing is placed in sampling area 260 then modified terahertz radiation beam 264 can include terahertz frequency spectral information related to background spectrum noise in the system.

Detector PCS 222 receives combined light 220 from splitter 192 and creates a beat pattern in the detector PCS. The beat pattern produces a local oscillation in conductance in the detector PCS at the frequency difference between the frequencies of the unmodulated phase modulator light 190 and second light 158. The local oscillation can serve as a homodyne local oscillator that oscillates at the same frequency as the resistance in the source PCS.

Detector PCS 222 includes terahertz optics 266 which focus modified electromagnetic radiation beam 264 onto a spiral antenna (not shown) of the detector PCS. The detector PCS antenna can receive the modified electromagnetic radiation beam and produce a received signal in the form of a modified voltage signal across the varying local oscillation conductance in the detector PCS. The modified voltage signal across the varying conductance produces a detector signal 270 that includes the sum and difference of the modified voltage signal and the local oscillation conductance. Because the conductance is modulated by the optical field of the unmodulated phase modulator light and the second light illuminating the detector switch, and the modified radiation beam is generated using the phase modulated light and the second light, the result is a homodyne mixing. The homodyne mixing of the locally generated oscillation in the detector and the modified voltage signal eliminates the terahertz frequencies to produce the detector signal. The difference signal between the locally generated oscillation and the modified voltage signal does not include the terahertz frequencies since the terahertz frequencies are common to both. The phase modulation of the first light carries through the system to produce a phase modulation of the modified voltage signal relative to the local oscillation.

The detector signal contains a frequency component at the phase modulation frequency resulting from the phase modulation, a modified signal component related to the sample, and signal noise. The detector signal also includes an interference pattern created by the detector PCS photomixing because of the phase differences between the locally generated oscillation and the modified voltage signal.

Detector signal 270 is carried to a low noise amplifier 272 over a detector signal conductor 274. Low noise amplifier 272 amplifies the detector signal and produces an amplified detector signal 276 which is carried to 1F lock-in amplifier 178 and 2F lock-in amplifier 180 over a detector signal conductor 278. 1F lock-in amplifier 178 uses the oscillator signal 176, and more particularly a first harmonic of oscillator signal 176, to detect a first harmonic signal component 290 of the detector signal. The first harmonic signal component of the detector signal can be the amplitude of any part of the detector signal that has a frequency that is the same as the oscillator signal. The first harmonic signal component is transferred to controller 160 through a 1F lock-in amplifier conductor 292. The 2F lock-in amplifier uses the oscillator signal 176, and more particularly a second harmonic of the oscillator signal, to detect a second harmonic signal component 294 of the detector signal. The second harmonic signal component of the detector signal can be the amplitude of any part of the detector signal that has a frequency that is the same as the second harmonic of the oscillator signal. The second harmonic signal component is transferred to controller 160 through a 2F lock-in amplifier conductor 296.

Controller 160 can be configured to process the received first and second harmonic components in various ways and can use the first and second harmonic components to produce a plot of power over a range of different terahertz frequencies. In the present embodiment, the controller is configured to receive the first and second harmonic components and to combine them to generate a power curve of the terahertz frequency spectral information such that the negative impact of the interference pattern is at least reduced, as will be discussed in further detail. Spectrometer system 150 can include a display device 300 which can receive display signals 302 from controller 160 over a display signal conductor 304 and can produce a graph 306 with results of one or more scans of samples. Spectrometer system 150 can produce information for analysis of the sample and other forms of information as well, as would be well understood by a person of ordinary skill in the art.

Although spectrometer system 150 is shown utilizing a single 1×2 phase modulator that is arranged in a certain configuration in optical circuit 230, other optical circuits having other types and/or numbers of phase modulators can also be used with the harmonic detectors and methods described herein. The optical circuits described in the co-pending and commonly owned application entitled Transceiver Method and Apparatus Having Phase Modulation and Common Mode Phase Drift Rejection (U.S. Ser. No. 14/490,411) can also be used and is incorporated herein by reference. In this co-pending application, in one embodiment an optical circuit includes a 2×2 phase modulator; in another embodiment an optical circuit includes two 1×2 phase modulators.

Referring now to FIGS. 4a, 4b, 5a and 5b in conjunction with FIGS. 2 and 3, in an embodiment, phase modulator control signal 172 can include an AC signal component in the form of a 6 kHz triangle wave 350 having a bias 352. Controller 160 can control reference oscillator 174 (the control connection is not specifically shown) to produce the triangle wave with an amplitude such that phase modulator 162 produces a periodic phase modulation phase shift of 180 degrees peak-to-peak. A one cycle sinusoidal waveform 354 is shown that represents one cycle of the voltage of the interference pattern included in detector signal 270. Applicants recognize that when the bias of the phase modulator control signal is at the zero Voltage point of the interference pattern during a scan, as shown in FIG. 4a, essentially all of the power in the detector signal is in the first harmonic component of the detector signal. The zero voltage point can also be referred to as quadrature and corresponds to nulls 112 in the power plot of the interference pattern shown in FIG. 2. FIG. 4b shows a first harmonic sine wave 356 that has the same frequency as the phase modulator control signal which can result when the bias of the phase modulator control signal is at the zero voltage point of waveform 354.

Referring now to FIG. 5a and FIG. 5b in conjunction with FIGS. 3, 4a and 4b, Applicants also recognize that by modulating the phase during a scan, when the bias of the phase modulator control signal 350 is at a peak of the interference pattern waveform 354, as shown in FIG. 5a, essentially all of the power in the detector signal is in the second harmonic component of the detector signal. FIG. 5b shows second harmonic wave 358 that has a frequency twice that of the phase modulator control signal that can result when the bias of the phase modulator control signal is centered on a peak. The centering of the bias of the phase modulator on a peak of interference pattern voltage waveform 354 corresponds to the centering of the bias on one of peaks 110 of the power plot of the interference pattern shown in FIG. 2. In an embodiment, if the phase modulator control signal is a 6 kHz triangle wave, the second harmonic component is at 12 kHz.

At any given time during a scan, the detector signal power is either primarily in the first harmonic component, primarily in the second harmonic component, or combined in the first and second harmonic components in a ratio of both the first and second harmonic components, which can be referred to as a harmonic ratio. The first and second harmonic components of the detector signal can be simultaneously detected and the controller can combine the first and second harmonic components. In this way, all of the power in the detector signal can be detected at any given time and signal strength is not lost by interference pattern nulls. In an embodiment, the controller can combine the first and second harmonic components by adding the components together to produce a power curve that represents the terahertz frequency spectral information of the sample and/or background in the spectrometer system. In another embodiment, the controller can determine the square of each of the first and second harmonic components before adding to determine absolute values of the harmonic components. The controller can be used for recording the values of the harmonic components.

In another embodiment, the controller can adjust the amplitude of the phase modulator control signal to adjust the harmonic ratio of the first and second harmonic components. The amplitude can be adjusted such that at the zero voltage offset the phase is modulated between a peak and a null. If the amplitude is adjusted too high and the phase goes past the peak and null then another unwanted second harmonic component is added. When the amplitude is adjusted too low and the phase does not reach the peak and null then neither the first or second harmonic components are as large as possible. Adjusting the harmonic ratio such that the first and second harmonics are at least essentially equal can produce a detector signal in which the first and second harmonics are maximized without introducing additional second harmonic power. In another embodiment, a multiplication factor can be applied to one or both of the first and second harmonic components in order to compensate for differences in detection and/or amplification efficiencies. In an embodiment, the first harmonic component can have a multiplication factor of 1.5 applied for compensation, although any suitable multiplication factor can be used.

Figure 6:
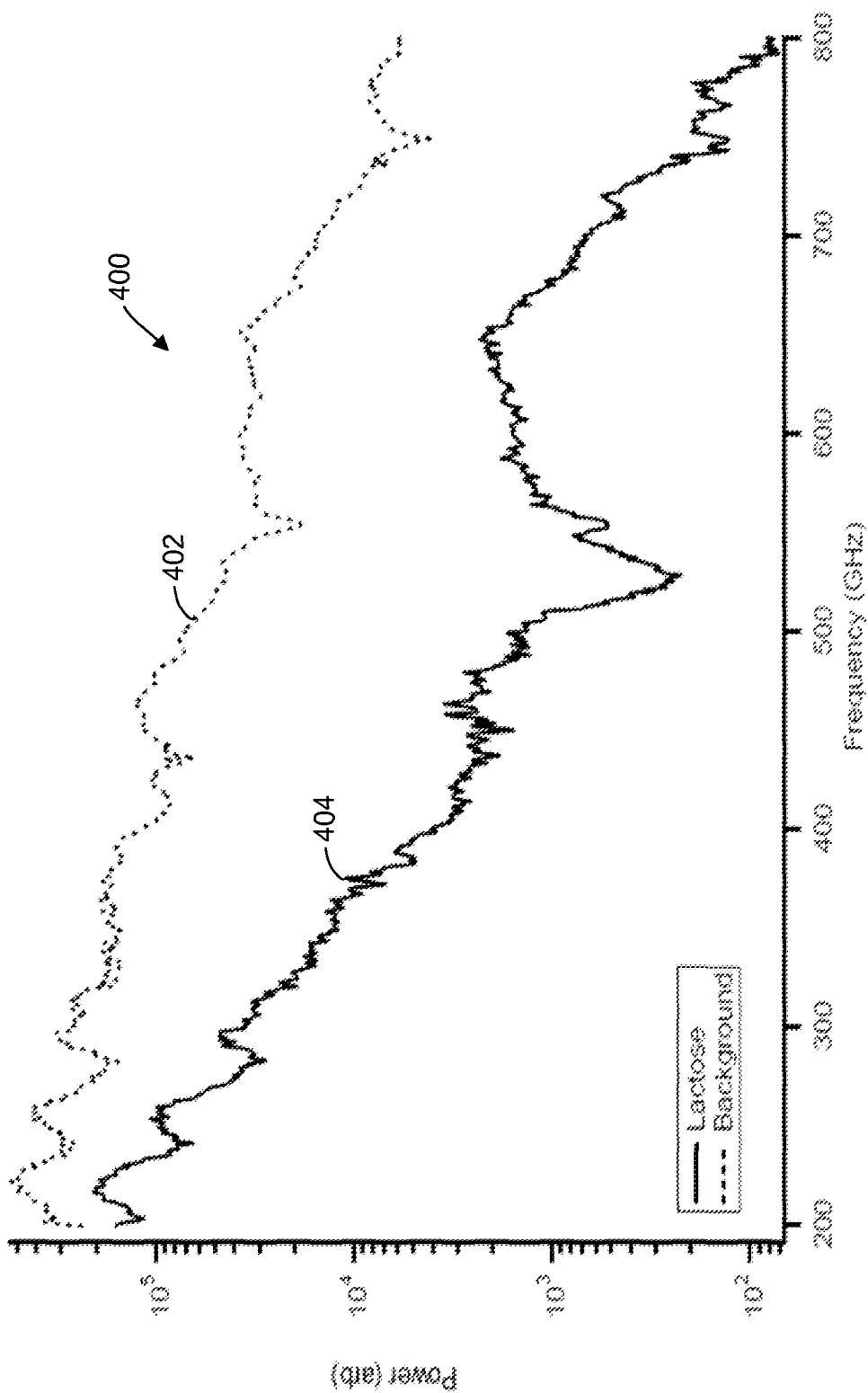
FIG. 6 is a graph having power curves which can be generated by the spectrometer shown in FIG. 3.

Referring now to FIG. 6 in conjunction with FIG. 3, a graph 400 is shown in which a terahertz spectrometer system according to the present disclosure was used to scan a sample of lactose powder. A power curve 402 of the frequency spectrum of the background of the sample area was produced from a single scan with 1 GHz resolution and a 100 millisecond time constant over approximately 1 minute duration. A power curve 404 of the frequency spectrum of a 2 mm thick sample of lactose powder was also produced from a single scan with 1 GHz resolution, 100 millisecond time constant over approximately 1 minute. In both the background and lactose scans, the first and second harmonics were detected simultaneously and summed, and the frequency was swept through a range from about 200 GHz to about 750 GHz.

Figure 7:
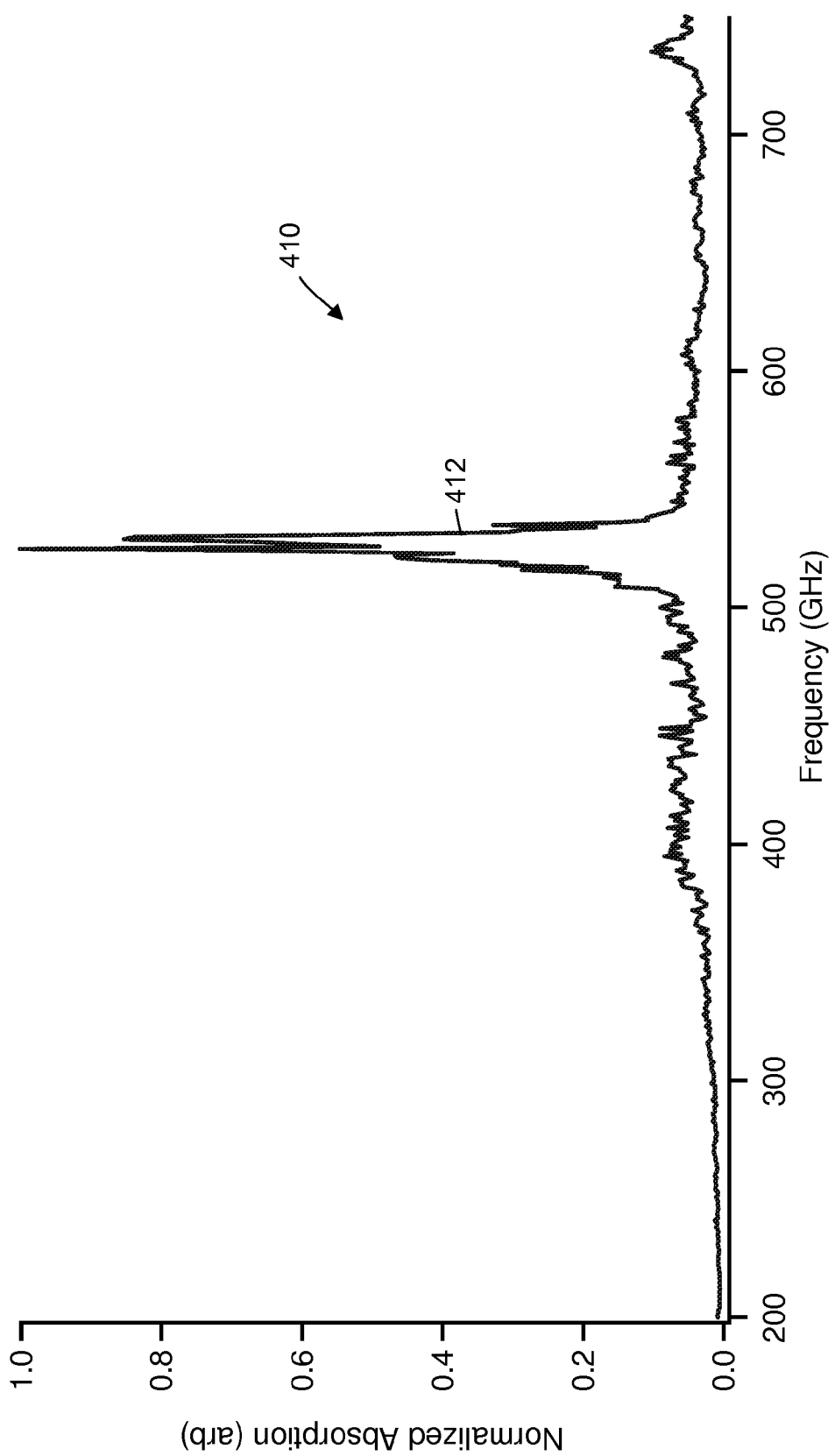
FIG. 7 is another graph having a power curve which can be generated by the spectrometer shown in FIG. 3.

Referring now to FIG. 7, in conjunction with FIG. 3 and FIG. 6, a graph 410 is shown in which a terahertz spectrometer system according to the present disclosure was used to scan a sample of lactose powder to produce a power curve 412 of the frequency spectrum. In this embodiment, the background was scanned up by sweeping the frequency of the terahertz radiation up from approximately 200 GHz to approximately 750 GHz; and the background was scanned down by sweeping the frequency from approximately 750 GHz to about 200 GHz. The up and down background scans were averaged. The lactose was also scanned up and down and the lactose scans were averaged. The lactose scan average was divided by the background scan average and a multiplier was applied to make the peak a factor of 1. The power curve clearly identifies an absorption of the radiation at approximately 530 GHz, which can be used for identifying lactose. The normalized spectrum of lactose eliminated an absorption line of water at approximately 556 GHz. No smoothing was performed to produce power curve 412.

Figure 8:
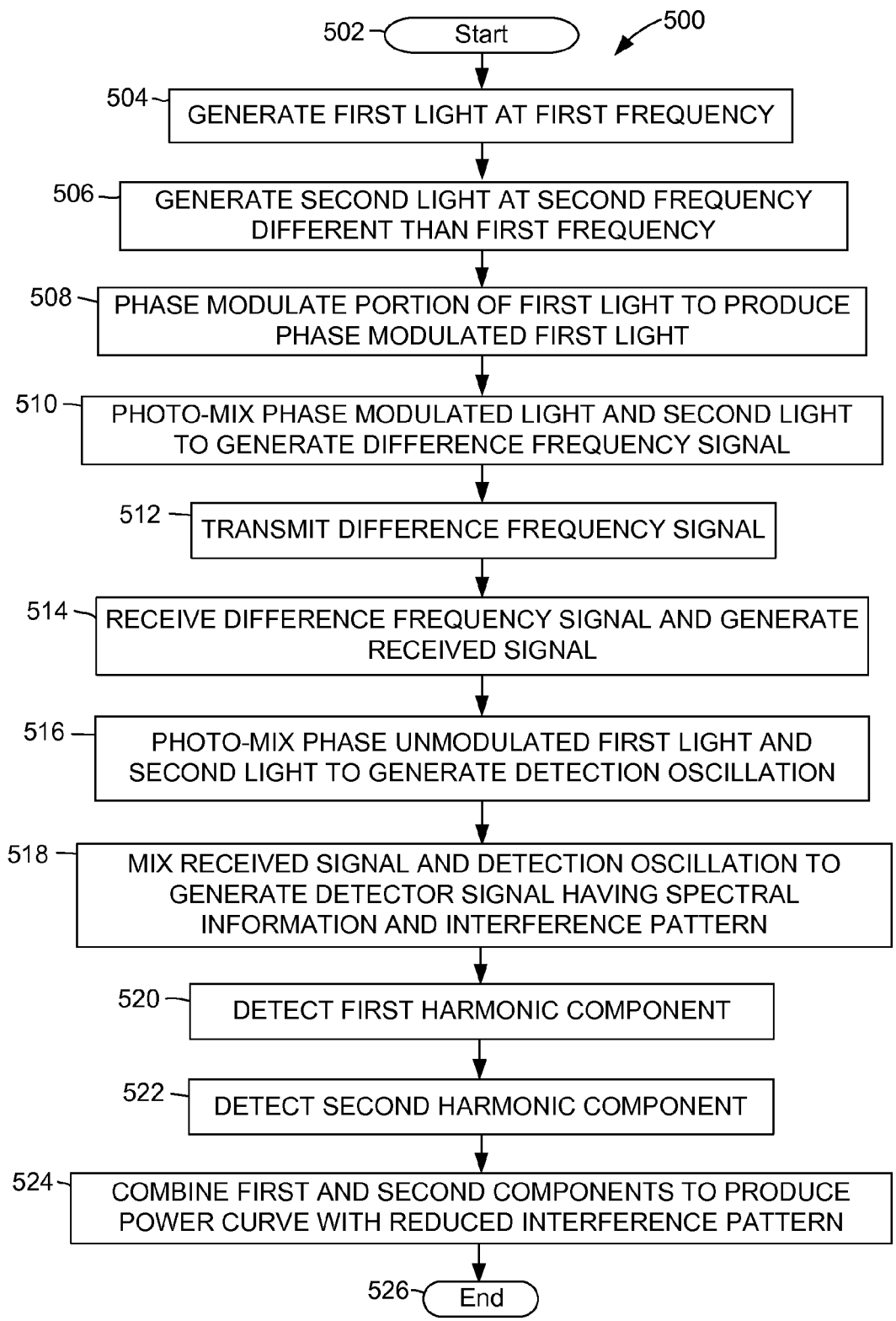
FIG. 8 is a flow diagram illustrating an embodiment of a method for determining terahertz spectral information of a material in a sampling area.

Referring now to FIG. 8, a method 500 is shown for determining terahertz frequency spectral information of a material in a sampling area. Method 500 begins at a start 502 and then proceeds to 504 where a first light is generated at a first frequency. Method 500 then proceeds to 506 where a second light is generated at a second frequency such that the first frequency and second frequency are different from one another by a difference frequency. Method 500 then proceeds to 508 where the phase of at least a portion of the first light is modulated relative to the second light by passing the portion of the first light through a phase modulator to produce a phase modulated light at a phase modulation frequency. Method 500 then proceeds to 510 where the phase modulated light and the second light are photo-mixed to generate a difference frequency signal at the difference frequency based at least in part on the photo-mixing. Method 500 then proceeds to 512 where the difference frequency signal is transmitted through the sampling area wherein the difference frequency signal is modified by the terahertz frequency spectral information by the material. Method 500 then proceeds to 514 where the modified difference frequency signal is received from the sampling area and a received signal is generated in response. Method 500 then proceeds to 516 where unmodulated first light and the second light is photo-mixed to generate a detection oscillation. Method 500 then proceeds to 518 where the received signal and the detection oscillation are mixed to generate a detector signal. The detector signal includes an interference pattern resulting from the photo-mixing and the terahertz frequency spectral information. Method 500 then proceeds to 520 where a first harmonic component of the detector signal is detected using a first harmonic of the modulation frequency. Method 500 then proceeds to 522 where a second harmonic component of the detector signal is detected using a second harmonic of the modulation frequency. The first and second harmonic components can be detected simultaneously and continuously during a scan. Method 500 then proceeds to 524 where the first harmonic component and second harmonic component are combined to produce a power curve of the terahertz frequency spectral information in which the interference pattern is at least partially eliminated. Method 500 then proceeds to 526 where the method ends.

Various embodiments of systems and techniques are disclosed herein in which a spectrometer system utilizes first and second harmonic detection in a way which eliminates the negative impact of interference pattern nulls. A spectrometer system utilizing first and second harmonic detection can use multiple background spectrum and sample scans since the changing interference pattern does not impact scan accuracy. Applicants submit that apparatus, systems and methods according to the present disclosure provide sweeping and heretofore unseen benefits that are not recognized by the prior art.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for determining terahertz frequency spectral information of a material in a sampling area, comprising:
   generating a first light at a first frequency;
   generating a second light at a second frequency such that the first frequency and second frequency are different from one another by a difference frequency;
   modulating the phase of a portion of the first light relative to the second light by passing the portion of the first light through a phase modulator to produce a phase modulated light at a phase modulation frequency;
   photo-mixing an phase modulated light and the second light and generating a difference frequency signal at the difference frequency based at least in part on the photo-mixing;
   transmitting the difference frequency signal through the sampling area wherein the difference frequency signal is modified to include the terahertz frequency spectral information by the material;
   receiving the modified difference frequency signal from the sampling area and generating a received signal in response;
   photo-mixing an unmodulated portion of the first light and the second light to generate a detection oscillation;
   mixing the received signal and the detection oscillation to generate a detector signal, the detector signal including an interference pattern resulting from photo-mixing and the terahertz frequency spectral information;
   detecting a first harmonic component of the detector signal using a first harmonic of the modulation frequency;
   detecting a second harmonic component of the detector signal using a second harmonic of the modulation frequency; and
   combining the first harmonic component and the second harmonic component to produce a power curve of the terahertz frequency spectral information in which the interference pattern is at least partially eliminated.

2. The method as defined in claim 1 wherein combining the first and second harmonic components includes squaring the first harmonic component and squaring the second harmonic component and determining a sum of the squared first and second harmonic components as part of producing the power curve.

3. The method as defined in claim 1, further comprising:
   applying a multiplication factor to at least one of the first harmonic component and second harmonic component of the detector signal before combining the first harmonic component and the second harmonic component in order to compensate for differences in detection of the first harmonic component and second harmonic component.

4. The method as defined in claim 3 wherein the multiplication factor is applied to the first harmonic component and is not applied to the second harmonic component.

5. The method as defined in claim 1 wherein the first harmonic component and second harmonic component are detected simultaneously.

6. The method as defined in claim 1 wherein the phase modulation frequency is in a range from about 1 kHz to about 10 MHz.

7. The method as defined in claim 1 wherein the phase modulator modulates the phase of the portion of the first light in response to receiving a phase modulation signal at the phase modulation frequency.

8. The method as defined in claim 7 wherein the phase modulation signal includes a triangle wave.

9. The method as defined in claim 7 wherein the detection of the first and second harmonic components defines a harmonic ratio between the detected first and second harmonic components, the method further comprising:
   adjusting the harmonic ratio using the amplitude of the phase modulation signal to increase the power of the terahertz frequency spectral information power curve.

10. The method as defined in claim 7 further comprising:
    generating the phase modulation signal such that the first harmonic component is at least essentially at a maximum amplitude when the phase modulation signal is centered at a null of the interference pattern and the second harmonic component is at least essentially at a maximum amplitude when the phase modulation signal is at least approximately centered at a peak of the interference pattern.

11. The method as defined in claim 9 wherein adjusting the harmonic ratio includes setting the first and second harmonics to be at least essentially equal.

12. The method as defined in claim 1 wherein the detection of the first and second harmonic components defines a harmonic ratio between the detected first and second harmonic components, the method further comprising:
    adjusting the harmonic ratio to increase the power of the terahertz frequency spectral information power curve.

13. The method as defined in claim 1 wherein the first and second lights are generated such that the difference frequency signal is in a range from about 10 MHz to about 10 THz.

14. The method as defined in claim 1 wherein the unmodulated portion of the first light is passed through the phase modulator without being phase modulated prior to the photo-mixing while the modulated portion is modulated.

15. A terahertz frequency spectrometer for performing spectroscopy on a sample in a sampling area, said spectrometer comprising:
- a first light source configured for generating a first light at a first frequency;
- a second light source for generating a second light at a second frequency, wherein the first and second lights are generated such that the first frequency and second frequency are different from one another by a difference frequency;
- a phase modulator configured for receiving a phase modulator signal at a phase modulation frequency, and for receiving at least a portion of the first light from the first light source, and for phase modulating at least a portion of the received first light relative to the second light to produce a phase modulated light that is phase modulated at the phase modulation frequency;
- a source photoconductive switch configured for receiving the phase modulated light and the second light for mixing to produce a beam of electromagnetic energy at the difference frequency in a direction toward the sample area;
- a detector photoconductive switch arranged for receiving the first light and the second light to produce a local oscillation at the difference frequency in response thereto, the detector photoconductive switch also arranged to receive at least a portion of the electromagnetic energy from the sample area as influenced by the sample and to produce a received signal that is related to the received electromagnetic energy, the detector photoconductive switch also arranged to mix the local oscillation and the received signal to produce a detector signal that is related to the difference between the local oscillation and the received signal and which includes terahertz frequency spectral information related to the sample, the detector signal including an interference pattern resulting from the detector photoconductive switch photo-mixing;
- a first harmonic detector configured to receive the detector signal and to detect a first harmonic component of the detector signal using a first harmonic of the phase modulation frequency;
- a second harmonic detector configured to receive the detector signal and to detect a second harmonic component of the detector signal using a second harmonic of the phase modulation frequency; and
- a controller configured to receive the detected first and second harmonic components and to combine the first and second harmonic components to produce a power curve of the terahertz frequency spectral information such that the interference pattern is at least partially eliminated.

16. The spectrometer as defined in claim 15 wherein the controller is configured to determine the sum of the square of the first harmonic and the square of the second harmonic to produce the power curve.

17. The spectrometer as defined in claim 15 wherein the controller is configured to apply a multiplication factor to at least one of the first harmonic component and second harmonic component of the detector signal before combining the first harmonic component and the second harmonic component in order to compensate for differences in detection of the first harmonic component and second harmonic component.

18. The spectrometer as defined in claim 15 wherein the first harmonic detector and the second harmonic detector are configured to receive the detector signal at the same time and detect the first harmonic component and the second harmonic component simultaneously.

19. The spectrometer as defined in claim 18 wherein the first harmonic detector and the second harmonic detector are configured to receive and utilize the phase modulator signal for detection.

20. The spectrometer as defined in claim 15 further comprising:
- a reference oscillator that is configured for generating the phase modulator signal for the phase modulator, the first harmonic detector and the second harmonic detector.

21. The spectrometer as defined in claim 20 wherein the reference oscillator is configured to generate the phase modulator signal as a triangle wave.

22. The spectrometer as defined in claim 20 wherein the reference oscillator is configured to generate the phase modulator signal at between about 1 kHz and about 10 MHz.

23. The spectrometer as defined in claim 20 wherein the controller is configured to adjust the amplitude of the phase modulator signal to increase the power of the terahertz frequency spectral information power curve.

24. The spectrometer as defined in claim 15 wherein the phase modulator is configured such that adjusting the amplitude of the phase modulator signal controls a harmonic ratio between the first and second harmonic components which controls the power of the terahertz frequency spectral information power curve.

25. The spectrometer as defined in claim 15 wherein the controller controls at least one of the first and second light sources such that the difference frequency signal is in a range from about 10 MHz to about 10 THz.

26. The spectrometer as defined in claim 15 wherein the phase modulator is a 1×2 phase modulator that receives all of the first light from the first light source and phase modulates a first portion and passes another portion without phase modulation and wherein the detector photoconductive switch is arranged for receiving the portion of the first light without phase modulation.

27. A terahertz frequency spectrometer for performing spectroscopy on a sample in a sampling area, said spectrometer comprising:
- a first light source configured for generating a first light at a first frequency;
- a second light source for generating a second light at a second frequency, wherein the first and second lights are generated such that the first frequency and second frequency are different from one another by a difference frequency;
- a phase modulator configured for receiving a phase modulator signal at a phase modulation frequency, and receiving the first light from the first light source and phase modulating a first portion of the first light and passing a second portion of the first light that is unmodulated to produce a first phase modulated light at the phase modulation frequency, and receiving the second light from the second light source and phase modulating a first portion of the second light and passing a second portion of the second light that is unmodulated to produce a second phase modulated light at the phase modulation frequency;
- a source photoconductive switch configured for receiving the first phase modulated light and the second phase modulated light for mixing to produce a beam of electromagnetic energy at the difference frequency in a direction toward the sample area;

a detector photoconductive switch arranged for receiving the first unmodulated light and the second unmodulated light to produce a local oscillation at the difference frequency in response thereto, the detector photoconductive switch also arranged to receive at least a portion of the electromagnetic energy from the sample area as influenced by the sample and to produce a received signal that is related to the received electromagnetic energy, the detector photoconductive switch also arranged to mix the local oscillation and the received signal to produce a detector signal that is related to the difference between the local oscillation and the received signal and which includes information related to the sample, the detector signal including an interference pattern resulting from the detector photoconductive switch photo-mixing;

a first harmonic detector configured to receive the detector signal and to detect a first harmonic component of the detector signal using the phase modulation signal;

a second harmonic detector configured to receive the detector signal and to detect a second harmonic component of the detector signal using the phase modulation signal; and a controller configured to receive the detected first and second harmonic components and to combine the first and second harmonic components to produce a power curve of the terahertz frequency spectral information such that the interference pattern is at least partially eliminated.

* * * * *